United States Patent
Naruse et al.

(10) Patent No.: US 7,297,206 B2
(45) Date of Patent: Nov. 20, 2007

(54) COATING MATERIAL COMPOSITION HAVING PHOTOCATALYTIC ACTIVITY

(75) Inventors: Tohru Naruse, Osaka (JP); Kouji Miyabara, Tokyo (JP)

(73) Assignee: Tososangyo Co., Ltd., Tokyo (JP)

( * ) Notice: Subject to any disclaimer, the term of this patent is extended or adjusted under 35 U.S.C. 154(b) by 562 days.

(21) Appl. No.: 10/474,938

(22) PCT Filed: Apr. 9, 2002

(86) PCT No.: PCT/JP02/03536

§ 371 (c)(1),
(2), (4) Date: Oct. 16, 2003

(87) PCT Pub. No.: WO02/085990

PCT Pub. Date: Oct. 31, 2002

(65) Prior Publication Data

US 2004/0116577 A1    Jun. 17, 2004

(30) Foreign Application Priority Data

Apr. 17, 2001 (JP) ............................. 2001-118484

(51) Int. Cl.
*C04B 12/04* (2006.01)
(52) U.S. Cl. ...................... 106/634; 106/635
(58) Field of Classification Search ................ 106/634, 106/635
See application file for complete search history.

(56) References Cited

U.S. PATENT DOCUMENTS 3,721,574 A * 3/1973 Schneider et al. .......... 106/623
3,893,864 A * 7/1975 Beers ......................... 106/1.17
3,895,956 A * 7/1975 Yoshida et al. ........... 106/204.3
3,969,266 A   7/1976 Iler
5,658,841 A * 8/1997 Tanaka et al. ............... 502/305
5,824,147 A * 10/1998 Drechsler et al. ........... 106/600
6,063,849 A * 5/2000 Morris et al. ................ 524/432
6,569,520 B1 * 5/2003 Jacobs ......................... 428/330

FOREIGN PATENT DOCUMENTS

GB    1148950    4/1969

OTHER PUBLICATIONS

Patent Abstracts of Japan, Publicaiton No. 2000-044224, published Feb. 15, 2000, entitled "Preparation of Silica Sol and Method for Using Same", Inventors: Miyahara Yuikiharu et al. (1 p.).
Patent Abstracts of Japan, Publication No. 2000-044807, published Feb. 15, 2000, entitled "Resin Composition, Its Production and Coated Product", Inventors: Ochi Ikuro et al. (2 pp.).
Patent Abstracts of Japan, Publication No. 10-237353, published Sep. 8, 1998, entitled "Hydrophilic Coating Agent and Surface Hydrophilic Substrate", Inventors: Ogata Shiro et al. (1 p.).

* cited by examiner

*Primary Examiner*—Margaret G. Moore
(74) *Attorney, Agent, or Firm*—The Webb Law Firm, P.C.

(57) ABSTRACT

Disclosed herein is a photocatalytic coating composition that enables control of refractive index, film density and hydrophilicity and gives a film with improved strength and adhesion. The photocatalytic coating composition comprises: (1) an alkali silicate aqueous solution having: (A) a molar ratio of silicon to an alkali ($SiO_2/(A_2O+B)$) (A: alkali metal, B: $NH_3$)) in the range of 4 to 30; and (B) a silicon concentration in terms of oxide ($SiO_2$ concentration) in the range of 6.8 to 30% by weight; and (2) a photocatalytic compound.

22 Claims, 3 Drawing Sheets

COATING MATERIAL COMPOSITION HAVING PHOTOCATALYTIC ACTIVITY

FIELD OF THE INVENTION

The present invention relates to a photocatalytic coating composition for coating and painting applications. The composition may be suitably used for the exterior walls of buildings, window frames, automobiles, railway vehicles, aircraft, marine vessels, guardrails, sound insulation walls, street lights and various signs that are made of plastics, metals, glass, ceramic, concrete, wood, stone, combinations or laminates thereof, and parts comprising these materials.

BACKGROUND OF THE INVENTION

Silicon resins are typical coating agents that make a hydrophilic surface over glass lenses, bathroom mirrors, injection needles, etc. to produce antifogging effects or the like. The silicon resins mixed with photocatalytic anatase $TiO_2$ are also well known in the art as the coating agents which can form a hydrophilic film on a surface of base material and produce hydrophilic effects upon exposure to ultraviolet rays.

The hydrophilic surface films comprising the silicon resins attract dust in the air by static electricity and are blackened as a result. The hydrophilic coating agents comprising the photocatalytic anatase $TiO_2$ and the silicon resin, need ultraviolet rays to produce hydrophilic effects. That is, no hydrophilic effects will be obtained when the agents have been applied to areas where the ultraviolet rays do not reach.

To overcome these problems, Japanese Patent Laid-Open Publication No. 237353/1998 discloses a hydrophilic coating agent that comprises amorphous titanium oxide and silicon oxide. The examples of the silicon oxide include silicon dioxides such as colloidal silica; siloxane compounds such as silicone and organopolysiloxane; and water glass.

However, these are disadvantage in that:

the colloidal silica has a poor dispersibility in combination with a photocatalytic compound (titanium oxide), particularly when the photocatalytic compound is ultrafine powder;

the siloxane compounds have an insufficient dispersibility and a film obtained from the dispersion has a poor mechanical strength; and the water glass has an insufficient dispersibility due to its low anion activity.

Meanwhile, the construction and painting industries suffer from pollution-related problems, such as contamination to the building exteriors and to other paint films on building structures. The pollutants include combustion products such as carbon blacks, and inorganic substances such as urban dust and clay particles. This diversity of the pollutants complicates the antifouling measures. It was widely accepted that water-repellent paints, such as polytetrafluoroethylene, would be effective for the prevention of contamination to building exteriors. But it has recently been considered that the film surface should be as hydrophilic as possible against the contamination by urban dust that contains much lipophilic constituents. Thus, proposals have been made to paint buildings with hydrophilic graft polymers. The paint films of graft polymers have a hydrophilicity such that water has a contact angle of 30 to 40°. However, inorganic dusts, typically clay minerals, have a contact angle with water ranging from 20 to 50°. They have an affinity for the graft, polymer paint films having a contact angle with water of 30 to 40° and easily adhere to the film surface. Accordingly, the graft polymer paint films will not be able to prevent the contamination by the inorganic dusts. Many hydrophilic paints are commercially available. They comprise acrylic resins, acryl silicon resins, aqueous silicone, block polymers of silicon resins and acrylic resins, acryl styrene resins, sorbitan fatty acid ethylene oxide, sorbitan fatty acid esters, urethane acetates, urethanes crosslinked with polycarbonate diols and/or polyisocyanates, and crosslinked alkyl polyacrylates. These hydrophilic paints have a relatively large contact angle with water and will not effectively prevent the contamination by city dust that contains much lipophilic constituents.

An alkali silicate aqueous solution called water glass contains relatively large amounts of alkali ions in order to maintain the solution state. The molar ratio of silicon to an alkali ($SiO_2/(A_2O+B)$) (A: alkali metal, B: $NH_3$)) is usually less than 4. Although the solution contains silicate ions and alkali ions, the negative charge quantity of the solution is small. Therefore, the anionic activity is low and the zeta-potential that is an indication of the anionic activity is in the range of −14 MV or less but more than −40 MV.

On the other hand, primary particles such as silicic acid sol or colloidal silica have neither internal surface area nor crystalline portion, and they are dispersed in an alkaline medium. The alkali reacts with the silica particle to cause a negative charge on the silica surface. The silica particles that have been thus negatively charged stabilize by virtue of the repulsion of the negative charge between the particles. However, many silanol groups (Si—OH) are present on the surface of the silica colloidal substance in addition to the silicate anions that give the negative charge. Consequently, the negative charge quantity is reduced to the zeta-potential of −25 to −38 MV.

Colloidal silica results from the dealkalization of water glass. But a stable intermediate between the water glass and the colloidal silica has not been obtained. The reason is that with the progress of dealkalization, the molar ratio is raised to the extent where the water glass can no longer maintain the solution state. In general, precipitation of silica takes place when the molar ratio is 4.2 or more, and the water glass cannot maintain the solution state.

If a high-molar ratio alkali silicate aqueous solution having solution-like characteristics like the water glass and having a high molar ratio and a high $SiO_2$ concentration similarly to the colloidal silica is used as a component in the photocatalytic coating composition, the composition will produce a dense film having a high film strength and an excellent bond strength. If the film can be given an appropriate hydrophilicity, all the problems described above could be solved at once.

That is to say, it should be studied to use an alkali silicate aqueous solution that has a high molar ratio, a high activity and a high $SiO_2$ concentration without losing solution-like characteristics like the water glass.

However, the molar ratio cannot be raised by simply concentrating the water glass through evaporation. For example, if a water glass product having the highest molar ratio 4.0 is concentrated to an $SiO_2$ concentration of 30% by weight, the product will gel completely.

On the other hand, ultrafiltration is a conventional means for the concentration of colloidal silica (see U.S. Pat. No. 3,969,266, U.K. Patent No. 1,148,950, Japanese Patent Laid-Open Publication No. 15022/1983, etc.). If the silica particles have grown to some extent, the colloidal silica would be satisfactorily concentrated by the ultrafiltration. However, the water glass contains large amounts of low-molecular weight components, such as ions, and therefore the yield obtained by the ultrafiltration is low. Moreover, many ions are lost in the ultrafiltration and the water glass loses its inherent anion activity as a result.

The present invention solves the problems described above, by providing a photocatalytic coating composition that comprises an alkali silicate aqueous solution and a photocatalytic compound, wherein the aqueous solution has intermediate characteristics between water glass and colloidal silica and has a high molar ratio ($SiO_2/(A_2O+B)$) (A: alkali metal, B: $NH_3$)), a high silicon content and a high anionic activity. This combination enables control of refractive index, film density and hydrophilicity and gives a film with improved strength and adhesion.

SUMMARY OF THE INVENTION

The photocatalytic coating composition according to the invention comprises:

(1) an alkali silicate aqueous solution having:
 (A) a molar ratio of silicon to an alkali ($SiO_2/(A_2O+B)$) (A: alkali metal, B: $NH_3$)) in the range of 4 to 30; and
 (B) a silicon concentration in terms of oxide ($SiO_2$ concentration) in the range of 6.8 to 30% by weight; and
(2) a photocatalytic compound.

The photocatalytic coating composition preferably contains the alkali silicate aqueous solution (1) in an amount in terms of solids of 100 parts by weight and the photocatalytic compound (2) in an amount of 95 to 9500 parts by weight.

In the photocatalytic coating composition, the photocatalytic compound (2) is preferably an anatase titanium oxide.

The photocatalytic coating composition may further contain a film-forming auxiliary (3); in this case the composition preferably contains the alkali silicate aqueous solution (1) in an amount in terms of solids of 100 parts by weight, the photocatalytic compound (2) in an amount of 95 to 9500 parts by weight, and the film-forming auxiliary (3) in an amount of 95 to 9500 parts by weight.

The alkali silicate aqueous solution (1) preferably satisfies, in addition to the above properties (A) and (B), at least one of the following properties (C) to (F):

(C) the zeta-potential is in the range of −40 MV to −80 MV;

(D) the peak area at the chemical shift of −100 to −120 ppm in the $^{29}$Si-NMR measurement is 1.35 times or more greater than the peak area of water glass at the chemical shift of −100 to −120 ppm measured by $^{29}$Si-NMR under the same conditions and is 1.20 times or more greater than the peak area of colloidal silica at the chemical shift of −100 to −120 ppm measured by $^{29}$Si-NMR under the same conditions;

(E) the transmittance within the wavelength region of 1000 to 200 nm measured by an absorptiometry is in the range of 90 to 100%; and (F) the electric conductivity is in the range of 2.1 to 35 mS/cm.

DETAILED DESCRIPTION OF THE INVENTION

The present invention will be described in more detain hereinafter.

As has been described above, the photocatalytic coating composition essentially contains a specific alkali silicate aqueous solution (1) and a specific photocatalytic compound (2), and optionally a film-forming auxiliary (3). These components will be described individually hereinbelow.

Alkali Silicate Aqueous Solution (1)

The alkali silicate aqueous solution used in the invention has intermediate characteristics between water glass and colloidal silica and has a high molar ratio ($SiO_2/(A_2O+B)$) (A: alkali metal, B: $NH_3$)), a high silicon content and a high anionic activity.

That is to say, the alkali silicate aqueous solution is characterized in that the ratio of the silicon content to the alkali content is high as compared with the usual water glass. The alkali employable herein is, for example, lithium, sodium, potassium or ammonium, and is most generally sodium.

In the alkali silicate aqueous solution, the molar ratio (A) of silicon to the alkali ($SiO_2/(A_2O+B)$) (A: alkali metal, B: $NH_3$)) is in the range of 4 to 30, preferably 9 to 26, and more preferably 12 to 21. When the alkali is lithium, sodium, potassium or the like, the molar ratio is a value calculated in terms of oxide ($A_2O$ wherein A is an alkali metal). When the alkali is ammonium, the molar ratio is a value calculated on the basis of ammonia. The alkali metal and ammonium may be used in combination. In this specification, the expression ($SiO_2/(A_2O+B)$) (A: alkali metal, B: $NH_3$)) will be sometimes referred to simply as the "molar ratio" hereinafter.

As the usual water glass is being dealkalized, the molar ratio ($SiO_2/(A_2O+B)$) (A: alkali metal, B: $NH_3$)) is raised to an extent where precipitation of silica is caused. As a result, the water glass no longer maintains the solution state. However, the solution used in the present invention stably maintains its solution state under similar conditions, which is thought largely due to the presence of the anions mentioned above. This high anionic activity leads to the maintaining of the stable solution state. Specifically, the silicate anions actively function even after polymerization stopper Na in the water glass has been removed, and they form an electric double layer and thereby maintain the solution-state stably.

In the alkali silicate aqueous solution of the invention, the silicon concentration (B) in terms of oxide, i.e., $SiO_2$ concentration, is in the range of 6.8 to 30% by weight, preferably 8 to 26% by weight, and more preferably 14 to 22% by weight.

The silicon concentration in the alkali silicate aqueous solution is almost the same as that of a silicic acid sol or colloidal silica.

The alkali silicate aqueous solution preferably satisfies, in addition to the above properties (A) and (B), at least one of the following(properties (C) to (F).

The anionic activity is evaluated by a zeta-potential. In the alkali silicate aqueous solution, the zeta-potential (C) is preferably in the range of −40 MV to −80 MV, more preferably −50 MV to −80 MV, and particularly preferably −58 MV to −80 MV.

The zeta-potential is a parameter relating to the dispersion or flocculation of particles. When many particles of the same kind are dispersed in a liquid, these particles have the same electric charge. As the electric charge becomes higher, these particles repel each other and are held stably without flocculating. If the particles have no electric charge or if a substance of opposite electric charge is contained, the particles flocculate and settle immediately. The electric charges of the particles depend also on pH of the solution.

In the alkali silicate aqueous solution, the zeta-potential is negative as described above. Further, the solution contains many anionic molecules. Consequently, the solution has a high anionic activity.

The anionic molecules contained in the alkali silicate aqueous solution are extremely small, smaller than colloids such as colloidal silica. Accordingly, the alkali silicate aqueous solution will not show any behavior like a sol in spite of the presence of these anionic particles. Therefore, the solution can be treated substantially as a normal solution. This is backed up also with the transmittance described later.

Although how the anionic particles are present is not always clear, it is thought that they are present as ultrafine particles of nm order having SiO⁻ on their surfaces. Various structures of the silicate anions are known as described below. However, it is thought that the alkali silicate aqueous solution of the invention would contain few mono- or bifunctional anions assigned to linear polymers or polycyclic silicate anions, and will contain a great number of trifunctional Q3x, trifunctional Q3y and tetrafunctional Q4.

The usual colloidal silica contains few of such anions described above, and the zeta-potential thereof is in the range of about −25 MV to −38 MV. Although the water glass contains anions, the zeta-potential is in the range of about −14 MV to −40 MV because of few polyfunctional anion portions. (D) The peak area at the chemical shift of −100 to −120 ppm in the $^{29}$Si-NMR measurement is 1.35 times or more, preferably 1.35 to 2.5 times greater than the peak area of water glass at the chemical shift of −100 to −120 ppm measured by $^{29}$Si-NMR under the same conditions and is 1.20 times or more, preferably 1.20 to 1.33 times greater than the peak area of colloidal silica at the chemical shift of −100 to −120 ppm measured by $^{29}$Si-NMR under the same conditions. It can be seen from this fact that the alkali silicate aqueous solution of the invention contains few mono- or bifunctional anions assigned to linear polymers or polycyclic silicate anions, and contains a great number of trifunctional Q3x, trifunctional Q3y and tetrafunctional Q4.

The peak area is determined by correcting a base line and calculating the area enclosed with a vertical axis at −100 ppm, a vertical axis at −120 ppm and the spectral curve.

In the alkali silicate aqueous solution used in the invention, the transmittance (E) within the wavelength region of 1000 to 200 nm, as measured by an absorptiometry, is preferably in the range of 90 to 100%, and more preferably 95 to 100%.

The usual water glass has a transmittance that is similar to the above. But the transmittance of the colloidal silica within the wavelength region of 200 nm to 380 nm is extremely low, ranging from 10 to 0%. It can be seen from this fact that the alkali silicate aqueous solution of the invention has properties similar to the water glass.

Further, the alkali silicate aqueous solution has an electric conductivity (F) of preferably 2.1 to 35 mS/cm, more preferably 2.1 to 16 mS/cm, and particularly preferably 5.0 to 11.0 mS/cm. This high electric conductivity indicates that the alkali silicate aqueous solution is a highly desalted solution and is stable free from flocculation caused by the presence of silicate anions.

As described above, the alkali silicate aqueous solution has intermediate characteristics between water glass and colloidal silica and has a high molar ratio, a high silicon content and a high anionic activity.

Although there is no specific limitation on the process for preparing the above-mentioned alkali silicate aqueous solution, the present inventors have found that this novel solution can be prepared efficiently and stably by the following first and second processes.

The first process for preparing an alkali silicate aqueous solution used in the invention comprises dealkalizing a starting alkali silicate aqueous solution, which has a molar ratio (SiO$_2$/(A$_2$O+B)) (A: alkali metal, B: NH$_3$)) of less than 4 and a silicon concentration in terms-of oxide ($SiO_2$ concentration) of 2.0 to 12.0% by weight, by means of an electrodialysis device.

In the starting alkali silicate aqueous solution, the molar ratio of silicon to an alkali (defined by $SiO_2/(A_2O+B)$ (A: alkali metal, B: $NH_3$)) is less than 4, preferably from 1.5 to less than 4.0, and more preferably from about 2.8 to 3.5. Here, the alkali is as described above. The silicon concentration in terms of oxide ($SiO_2$ concentration) is in the range of 2.0 to 12.0% by weight, preferably 3.0 to 12.0% by weight, and more preferably about 4.5 to 12.0% by weight.

Figure 1:
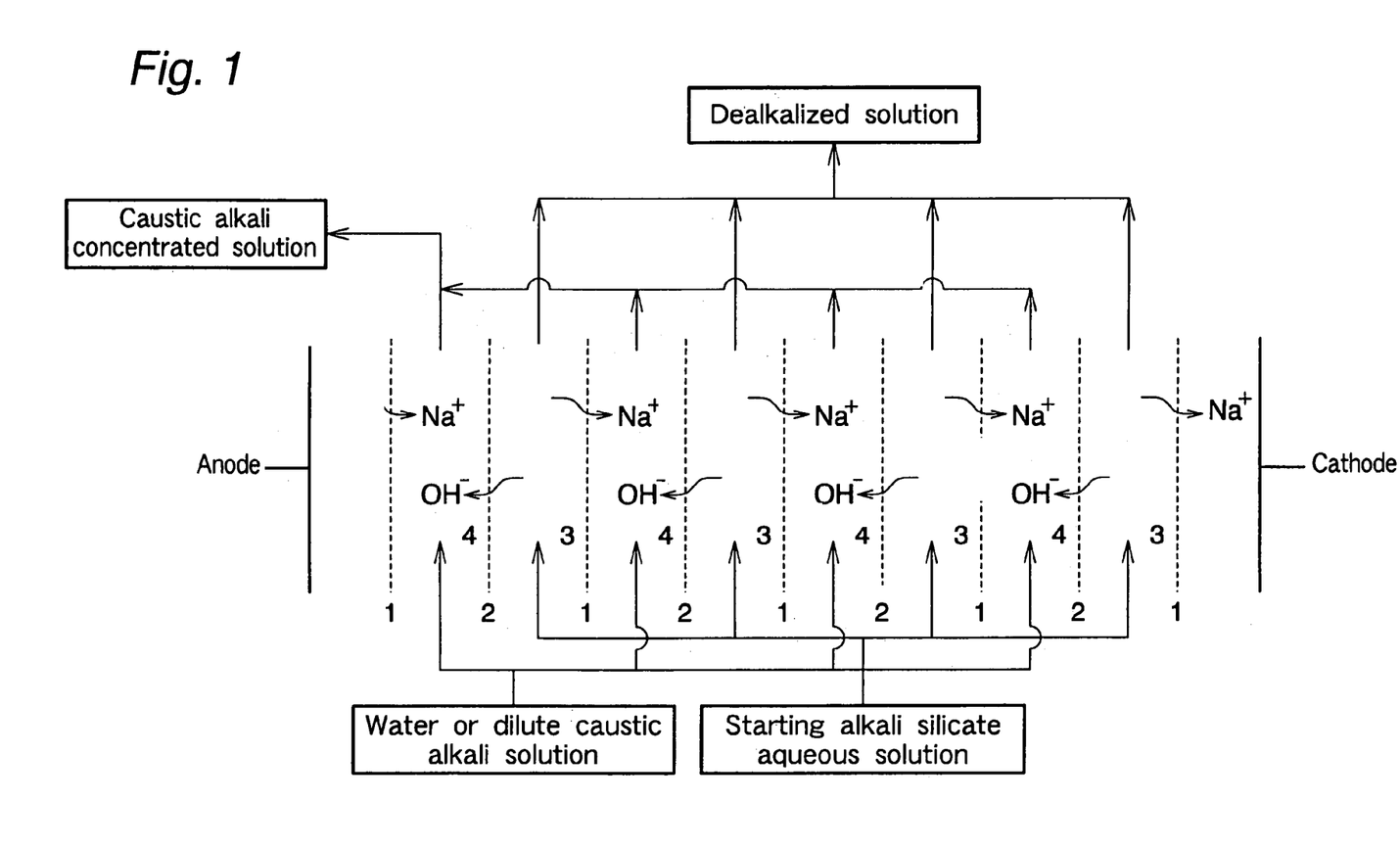
FIG. 1 is a schematic view of an electrodialysis device used in Production Example of the present invention.

In the electrodialysis device as shown in FIG. 1, cation exchange membranes 1 and anion exchange membranes 2 are alternately disposed and desalting zones 3 and concentration zones 4 are alternately arranged between an anode and a cathode. In the invention, any hitherto-known electrodialysis device of this constitution may be employed without any restriction. That is to say, the electrodes, ion exchange membranes and other necessary members to constitute the electrodialysis device may be selected from those commonly known without any restriction. For example, the ion exchange membranes industrially used include hydrocarbon type cation exchange membranes and anion exchange membranes that generally have a sulfonic acid group as a cation exchange group, a quaternary ammonium group as an anion exchange group, and a styrene/divinylbenzene copolymer as a reinforcing substrate. Further, fluorine-containing ion exchange membranes comprising a fluorine-containing polymer are also employable. In the electrodialysis device, it is preferable to use alkali-resistant ion exchange membranes since the starting alkali silicate aqueous solution to be subjected to electrodialysis is alkaline and a caustic alkali must be concentrated (produced).

To perform the electrodialysis, a starting alkali silicate aqueous solution is fed to the desalting zones 3 of the electrodialysis device, and water or a dilute caustic alkali aqueous solution to the concentration zones 4. The alkali metal ions (e.g., $Na^+$) present in the desalting zones 3 pass through the cation exchange membranes 1 into the concentration zones 4. And the hydroxide ions ($OH^-$) present in the desalting zones 3 pass through the anion exchange membranes 2 into the concentration zones 4. Thus, desalting is effected in the desalting zones 3. On the other hand, the solution found in the concentration zones 4, which then contains the alkali metal ions and the hydroxide ions that have moved from the desalting zones 3, is concentrated to obtain a caustic alkali aqueous solution.

Although the operational conditions of the electrodialysis device vary depending on the size of the device, the concentration of the starting alkali silicate aqueous solution, etc., the electric voltage is controlled so as to be constant at 0.6 V/pair, and the feed rate of the starting alkali silicate aqueous solution to the desalting zones is suitably about 3.1 l/min. The water or dilute caustic alkali aqueous solution is fed to the concentration zones at a rate of about 3.1 l/min.

From the desalting zones 3, an alkali silicate aqueous solution (dealkalized solution) is obtained that has a lowered alkali concentration by the dealkalization.

In order to inhibit precipitation of silica solids while increasing the molar ratio ($SiO_2/(A_2O+B)$), it is desirable to adjust the molar ratio of the alkali silicate aqueous solution obtained from the desalting zones 3 to preferably 4.0 to 30, more preferably 9 to 26, and particularly preferably about 12 to 21.

By appropriate selection of the electrodialysis conditions, particularly the electric conductivity, the molar balance ($SiO_2/(A_2O+B)$) of the alkali silicate aqueous solution can be controlled. In general, the value of $SiO_2/(A_2O+B)$ tends to be low when the electric conductivity is high, and tends to be high when the electric conductivity is low.

The starting alkali silicate aqueous solution used in the first process has a relatively high silicon concentration. Therefore, the silicon concentration of the resulting alkali silicate aqueous solution will be preferably 6.8 to 12% by weight, and more preferably about 6.8 to 9%. by weight in terms of $SiO_2$.

In the conventional electrodialysis of alkali silicate aqueous solution, a starting alkali silicate aqueous solution is used with a relatively low silicon concentration in order to inhibit clogging of ion exchange membranes and to perform continuous operation. That is to say, the silicon concentration in terms of $SiO_2$ in the starting solution is at most about 6.0% by weight, and that in the resulting dealkalized solution is at most about 6.2% by weight. In contrast, the starting alkali silicate aqueous solution used in the first process has a relatively high $SiO_2$ concentration as described above. Therefore, a dealkalized solution (alkali silicate aqueous solution) having a high $SiO_2$ concentration can be obtained. As a result, the high-molar ratio active alkali silicate aqueous solution can be obtained that satisfies the aforesaid properties (A) and (B), and preferably further the aforesaid properties (C) to (F).

Through the electrodialysis, a caustic alkali aqueous solution is obtained from the concentration zones 4. During the course of dialysis, the silicic acid can occasionally pass through the ion exchange membranes, and the caustic alkali aqueous solution may contain such silicic acid in a trace amount, e.g., about 0.1 to 1% by weight of the solution. Such a caustic alkali aqueous solution can be recycled as it is in the case where inclusion of a trace amount of silicic acid makes no matter; for example, it can be used as an alkali source for preparing an alkali silicate aqueous solution that is used as a starting material in the preparation of silicic acid sol. Further, such a caustic alkali aqueous solution can also be used for the preparation of alkali silicate of JIS No. 1 or No. 2, sodium metasilicate and sodium orthosilicate each of which has a low $SiO_2/A_2O$ ratio.

By allowing the solution in the concentration zones 4 to retain there during the electrodialysis, the alkali concentration can be lowered.

In the first process of the invention, a reverse osmosis membrane method may be carried out to further concentrate the dealkalized solution (alkali silicate aqueous solution) obtained from the desalting zones.

The reverse osmosis membrane used herein is preferably an alkali-resistant composite membrane since the dealkalized solution contains a trace amount of alkali. The fractional molecular weight of the reverse osmosis membrane is preferably in the range of 100 to 20000, more preferably 100 to 1000, and particularly preferably 100 to 800. The reverse osmosis membrane method has a feature that the water content may be removed with small energy consumption without evaporating the water, whereby a valuable product (here, the alkali silicate) can be concentrated and recovered stably and efficiently in a solution state. For example, conventional methods to concentrate the colloidal silica include an evaporation concentration method in which concentration is carried out by raising the temperature to 100° C. that is the boiling point of water, and a vacuum distillation method in which concentration is carried out by lowering the boiling point of water under vacuum. In these methods, particles of colloidal silica are allowed to grow especially under the heating conditions. Therefore, only some silicate anions are present on the particle surfaces and the activity is liable to be low.

On the other hand, an ultrafiltration method in which the water content is removed using an organic thin film such as of polysulfone, polyacrylonitrile, cellulose acetate, nitrocellulose or cellulose has been generally employed from the viewpoints of energy and easy condition control (see U.S. Pat. No. 3,969,266, U.K. Patent No. 1,148,950 and Japanese Patent Laid-Open Publication No. 15022/1983).

However, the ultrafiltration method has a disadvantage that useful and highly active silicate anions resulting from the electrodialysis are removed.

In contrast, the reverse osmosis membrane method in which organic thin films stable in a strong alkali aqueous solution are sterically arranged to constitute a module of excellent volume efficiency, is energy-saving and compact, has easy condition control, and enables recovery of a valuable product by concentration without application of heat and without modification of the product.

In the reverse osmosis, it is desirable to adjust the pressure (at the entrance of the reverse osmosis module) to preferably not more than 4.0 MPa, and more preferably from about 3.2 to 3.8 MPa.

It is desirable to adjust the solution temperature to about 35 to 40° C.

By the use of the reverse osmosis membrane method in combination, the alkali silicate aqueous solution obtained by the electrodialysis can be further concentrated to a silicon concentration in terms of $SiO_2$ of preferably 3.0 to 30.0% by weight, and more preferably about 6.5 to 30% by weight.

When the reverse osmosis membrane method is used in combination, such a high silicon concentration solution as mentioned above has not to be used as the starting alkali silicate aqueous solution.

That is to say, the second process for preparing an alkali silicate aqueous solution according to the invention comprises:

dealkalizing a starting alkali silicate aqueous solution having a molar ratio ($SiO_2/(A_2O+B)$) of less than 4 by means of an electrodialysis device, and concentrating the dealkalized solution by a reverse osmosis membrane method.

In the starting alkali silicate aqueous solution, the molar ratio ($SiO_2/(A_2O+B)$) of silicon to an alkali (the alkali is as described above) is less than 4, preferably from 1.5 to less than 4.0, and more preferably from about 2.8 to 3.5. Although the silicon concentration in terms of oxide ($SiO_2$ concentration) is not specifically restricted, it is in the range of 2.0 to 12.0% by weight, preferably 3.0 to 12.0% by weight, and more preferably about 4.5 to 12.0% by weight.

The device and the conditions used for the electrodialysis are the same as in the aforesaid first process.

In order to inhibit precipitation of silica solids while increasing the molar ratio ($SiO_2/(A_2O+B)$), the molar ratio ($SiO_2/(A_2O+B)$) of the dilute alkali silicate aqueous solution (dealkalized solution) obtained from the desalting zones 3, which then has a lowered alkali concentration, is desirably adjusted to preferably 4.0 to 30, more preferably 9 to 26, and particularly preferably about 12 to 21.

In the second process, it is desirable to adjust the silicon concentration in terms of $SiO_2$ of the dealkalized solution to preferably 3.0 to 10.0% by weight, and more preferably about 4.0 to 8.0% by weight.

In the second process, the dealkalized solution obtained from the desalting zones is then concentrated by a reverse osmosis membrane method.

The reverse osmosis membrane method is carried out in the same manner as previously described.

By the reverse osmosis membrane method, the water content is removed from the dealkalized solution and the dealkalized solution (alkali silicate solution) is thus concentrated. As a result, the high-molar ratio active alkali silicate aqueous solution can be obtained that satisfies the aforesaid properties (A) and (B), and preferably further the aforesaid properties (C) to (F).

The high-molar ratio active alkali silicate aqueous solution obtained by the invention will have a lowered alkali concentration (in terms of oxide) of 0.4% by weight or less. Where necessary, the alkali concentration can be further lowered by bringing the solution into contact with a cation exchange resin. As the cation exchange resin, R—$SO_3H$ type, R—COOH type and R—OH type cation exchange resins can be used without any restriction. The solution may be contacted with the ion exchange resin either after the electrodialysis or after the reverse osmosis.

As described above, the high-molar ratio active alkali silicate aqueous solution obtained by the electrodialysis and optionally further by the reverse osmosis membrane method, is treated by direct contact with the cation exchange resin. As a result of this treatment, the desalting in the alkali solution proceeds and thereby the molar ratio ($SiO_2/(A_2O+B)$) can be further enhanced. The contact with the cation exchange resin can be made by, for example, charging a 200-1000 $cm^3$ column with 240 to 530 $cm^3$ of cation exchange resin, washing the cation exchange resin with water and then passing the alkali silicate aqueous solution through the column under the conditions of pH of 5.0 to 6.0 and a flow rate of 4 to 25 ml/sec.

Photocatalytic Compound (2)

The photocatalytic compound for use in the invention may be a compound that itself has a photocatalytic action or a photocatalyst precursor convertible into a photocatalyst through a given treatment.

Examples of employable photocatalysts include $TiO_2$, ZnO, $SrTiO_3$, CdS, CdO, InP, $In_2O_3$, $BaTiO_3$, $K_2NbO_3$, $Fe_2O_3$, $Ta_2O_5$, $WO_3$, $Bi_2O_3$, NiO, $Cu_2O$, $SiO_2$, $MoS_2$, $MoS_3$, InPb, $RuO_2$, $CeO_2$, GaP, $ZrO_2$, $SnO_2$, $V_2O_5$, $KTaO_3$, $Nb_2O_5$, CuO, $MoO_3$, $Cr_2O_3$, GaAs, Si, CdSe, $CdFeO_3$ and $RaRhO_3$. Of these, anatase $TiO_2$ in the form of powder or sol is preferable.

The photocatalyst will preferably range in particle diameter from 1 to 20 nm, and particularly preferably 5 to 15 nm.

The anatase titanium oxide in sol state, in other words the anatase titanium oxide sol may be produced by heating an amorphous titanium peroxide sol at 100° C. or above. The amorphous titanium peroxide sol will be described later. The anatase titanium oxide sol has properties that are somewhat dependent on the heating temperature and time. For example, the heating treatment at 100° C. for 6 hours will produce an anatase titanium oxide sol, a yellow suspension, which has a pH ranging from 7.5 to 9.5 and particle diameters of 8 to 20 nm. The anatase titanium oxide sol can be stably stored at room temperature for a long time, but precipitation may be formed when the sol is mixed with an acid or a metal aqueous solution. The photocatalytic activity and acid resistance may be deteriorated when a large amount of Na ions are present in the sol.

Suitable photocatalysts include the anatase titanium oxide sol, and titanium dioxide powders, including ST-01 and ST-31 (both commercially available from Ishihara Sangyo Co., Ltd.). The binder used herein may be any compound that will not be deteriorated by the photocatalytic effect and will not lower the photocatalytic action. Desirably, the binder is an amorphous titanium peroxide sol (described later) that shows excellent binding properties at room temperature.

The photocatalytic coating composition of the invention preferably contains the photocatalytic compound (2) in an amount of 95 to 9500 parts by weight, and more preferably 95 to 4000 parts by weight based on 100 parts by weight of the solid contents in the alkali silicate aqueous solution (1).

Film-Forming Auxiliary (3)

The film-forming auxiliary (3) is an optional component that will be used to improve the coatability (coating ability) of the coating composition and to obtain a higher film adhesion. Exemplary auxiliaries include the amorphous titanium oxide, which is also used as the photocatalyst precursor, including amorphous titanium peroxide $TiO_3$ and amorphous titanium oxide $TiO_2$. The amorphous titanium peroxide and amorphous titanium oxide have substantially no photocatalytic action unlike the anatase titanium oxide $TiO_2$ and rutile titanium oxide $TiO_2$.

The amorphous titanium peroxide sol is particularly preferable as the amorphous titanium peroxide and may be produced by a-series of steps in which:

aqueous ammonia or an alkali hydroxide such as sodium hydroxide is added to a titanate aqueous solution such as of titanium tetrachloride $TiCl_4$; and the resulting light bluish white, amorphous titanium hydroxide $Ti(OH)_4$, which is otherwise called orthotitanic acid $H_4TiO_4$, is washed, separated and treated with a hydrogen peroxide solution.

The amorphous titanium peroxide sol has a pH ranging from 6.0 to 7.0 and particle diameters of 8 to 20 nm and is a yellow transparent liquid. Further, it can be stably stored at room temperature for a long time. The particle concentration in the sol is generally 1.40 to 1.60% and may be altered according to necessity. When a low concentration sol is required, the sol is used after diluted with distilled water or the like.

No crystallization occurs at ordinary temperature in the amorphous titanium peroxide sol, and the titanium peroxide will not have an anatase titanium oxide structure at such temperatures. The amorphous titanium peroxide sol has a good adhesion and high suitability for film production, and produces a uniform and flat thin film. The dry film obtained has characteristics that it does not dissolve in water and stays unaffected by the photocatalytic reaction. The amorphous titanium peroxide sol will begin to turn into the anatase titanium oxide sol on heating at 100° C. or above. When the amorphous titanium peroxide sol has been applied onto a substrate and dried, the dry film will be heated at 250° C. or above and is thus caused to turn into the anatase titanium oxide.

The amorphous titanium oxide for use in the invention may be a known one in the form of fine powder or in the form of sol that results from the suspending and dispersing of the fine powder in a solvent such as water or an alcohol. When the fine powder of amorphous titanium oxide with no photocatalytic capability is used, the powder is mixed with a binder such as a thermosetting water-soluble resin for coating applications.

Film-forming auxiliaries (3) employable in the invention other than the amorphous titanium oxides include anionic surfactants and modified silicone-containing surfactants. The film-forming auxiliaries may be used in combination of two or more kinds.

Preferably, the photocatalytic coating composition contains the film-forming auxiliary (3) in an amount of 95 to 9500 parts by weight, and more preferably 95 to 4000 parts by weight based on 100 parts by weight of the solid contents in the alkali silicate aqueous solution (1).

Other Components

The photocatalytic coating composition may optionally contain another additive in addition to the above components. Optional components include silicon dioxide such as colloidal silica, silicone, siloxane compounds such as organopolysiloxane and water glass.

The photocatalytic reactivity may be enhanced or complemented by a metal capable of assisting the photocatalytic reaction, which may be added during the production of the composition. Such metals include Pt, Ag, Rh, Ru, Nb, Cu, Sn, Ni, Pd, Os, Ir, Zn, Cd, Fe, Se, Y and W. Alternatively, the photocatalyst may be used with an agent capable of voluntary emitting or luminous ultraviolet rays. This ultraviolet radiation agent is fed as individual particles or as a mixture with other particles.

In addition to the amorphous titanium oxide and silicon oxide, the photocatalytic coating composition may optionally contain a dielectric or conductive ceramic material that functions to shield ultraviolet rays and to prevent the static electricity discharge.

These components may be arbitrarily used unless detrimental effects are caused on the object of the invention. The amount thereof varies depending on the properties of these components and objective use; in general it is preferably 95 to 9500 parts by weight, and more preferably 95 to 4000 parts by weight based on 100 parts by weight of the solid contents in the alkali silicate aqueous solution (1).

Photocatalytic Coating Composition

The photocatalytic coating composition of the invention may be obtained by mixing the above-described components (1), (2) and optionally (3) and other components by use of a mixer. In carrying out the mixing, a diluent such as water may be used. The use of diluent is sometimes effective to improve the application properties.

Preferably, the photocatalytic coating composition will have the following compositions which although may be variable depending on the proportions of the above components.

The photocatalytic coating composition will preferably:

have a silicon concentration in terms of oxide ($SiO_2$ concentration) in the range of 0.05 to 3% by weight, more preferably 0.1 to 3% by weight, even more preferably 1 to 3% by weight, and particularly preferably 2 to 3% by weight;

contain the photocatalytic compound at 0.1 to 3% by weight, more preferably 0.5 to 3% by weight, even more preferably 1 to 3% by weight, and particularly preferably 1.5 to 3% by weight; and have a molar ratio of silicon to the alkali ($SiO_2/(A_2O+B)$ (A: alkali metal, B: $NH_3$)) in the range of 4 to 30, more preferably 15 to 30, even more preferably 20 to 30, and particularly preferably about 25 to 30.

When the titanium oxide has been used as the photocatalytic compound, the molar ratio ($TiO_2/SiO_2$) is 0.7 to 70, and preferably about 3 to 70.

The content of the film-forming auxiliary (3) is preferably.0.005 to 2% by weight, and more preferably about 0.01 to 2% by weight of the composition.

The remaining proportion will be a diluent, which is usually water.

Where necessary, the photocatalytic coating composition may be diluted to an appropriate extent before applied.

The photocatalytic coating composition may be applied to various substrates, including those comprising inorganic materials such as ceramics and glass; organic materials such as organic macromolecular resins, rubbers, woods and papers; and metal materials such as aluminum and steel. The size and shape of the substrates are not limited; the substrates may have a form of plate, needle, honeycomb, fiber, filter sheet, bead, foam and combinations thereof.

Coating methods with the photocatalytic coating composition include spray coating, dipping and spin coating. The composition is thus produced into a coating thin film (layer) in a thickness that will be determined in order to obtain the objective hydrophilicity and depending on the suitability for film production of the binder or the like. Generally, the film thickness will be in the range of 0.1 to 3 μm, and preferably about 1 to 3 μm.

The photocatalytic coating composition can be used for preventing the fogginess on showcase glass, bathroom mirrors, glass lenses and automotive windows and bodies; for reducing the pain caused by injection needles inserting into the body; for preventing the formation of dew condensation on windows and skylights; and for preventing any contamination to building materials, including silicon sealants and oil-based caulking materials found around prefabricated bathtubs in bathroom, between exterior walls and window frames, and between tiles. The photocatalyst will function to decompose any organic contaminants, including dust, oil and grime, that have adhered onto inorganic bases such as glass and tiles. Therefore, the photocatalytic coating composition may be suitably used for exterior building materials.

The photocatalytic coating combination according to the invention enables control of refractive index, film density and hydrophilicity and gives a film having improved strength and adhesion.

EXAMPLES

The present invention will be hereinafter described in detail by the following Examples, but it should be construed that the invention is in no way limited to those Examples.

The electrodialysis device and the reverse osmosis device used in the examples are the following.

Electrodialysis Device (Manufactured by TOKUYAMA Corp.)
  Anion exchange membrane (10 membranes): AHA (trade name), available from TOKUYAMA Corp.
  Cation exchange membrane (12 membranes): CMB (trade name), available from TOKUYAMA Corp.
    Electrode material: Ni plate
    Distance between electrodes: 26.2 mm
    Distance between anion exchange membrane and cation exchange membrane: 0.7 mm
    Area of ion exchange membrane: 2 dm²/membrane Reverse Osmosis Device (Manufactured by Toray Engineering Co., Ltd.)
  Reverse osmosis membrane: mini-spiral membrane (alkali-resistant synthetic composite membrane, fractional molecular weight: 200, membrane area: 1.6 m², φ2.0×40 L)
  High-pressure circulating pump (SUS316L/NBR)
    normal: 5-12.5 L/min, 40 kgf/cm²
    pressure-resistant: 10 L/min, 70 kgf/cm²
  Spiral vessel: for φ2.0×40 L, FRP withstand pressure 70 kgf/cm²
  Accumulator: bladder type, 100 cc, maximum working pressure 70 kgf/cm²

Production Example 1

The specific gravity and the composition of the alkali silicate aqueous solution used as a starting material are as follows.
  Specific gravity (15° C.): 1.404
  $SiO_2$ (%): 28.12
  $Na_2O$ (%): 9.21
  $SiO_2/Na_2O$ (molar ratio): 3.15

The alkali silicate aqueous solution was diluted with water to obtain an alkali silicate aqueous solution having a silicic acid concentration (in terms of $SiO_2$) of 6% by weight.

The thus-obtained starting alkali silicate aqueous solution was fed to desalting zones of such an electrodialysis device as previously specified, and a dilute caustic soda solution was fed to concentration zones of the device.

Then, electrodialysis was initiated through a constant voltage operation at 0.6 V/pair (stack voltage: 6 V/10 pairs) and a tank (including electrode zones) voltage of 9 to 10 V. The initial conductivity was 24 mS/cm. The electrodialysis was carried out until the conductivity was lowered to less than 4.5 mS/cm. The average dialysis time needed until the conductivity reached less than 4.5 mS/cm was 80 minutes. The dealkalized solution obtained from the desalting zones had a silica content ($SiO_2$) of 6.4% by weight and an alkali content ($Na_2O$) of 0.35% by weight.

Figure 2:
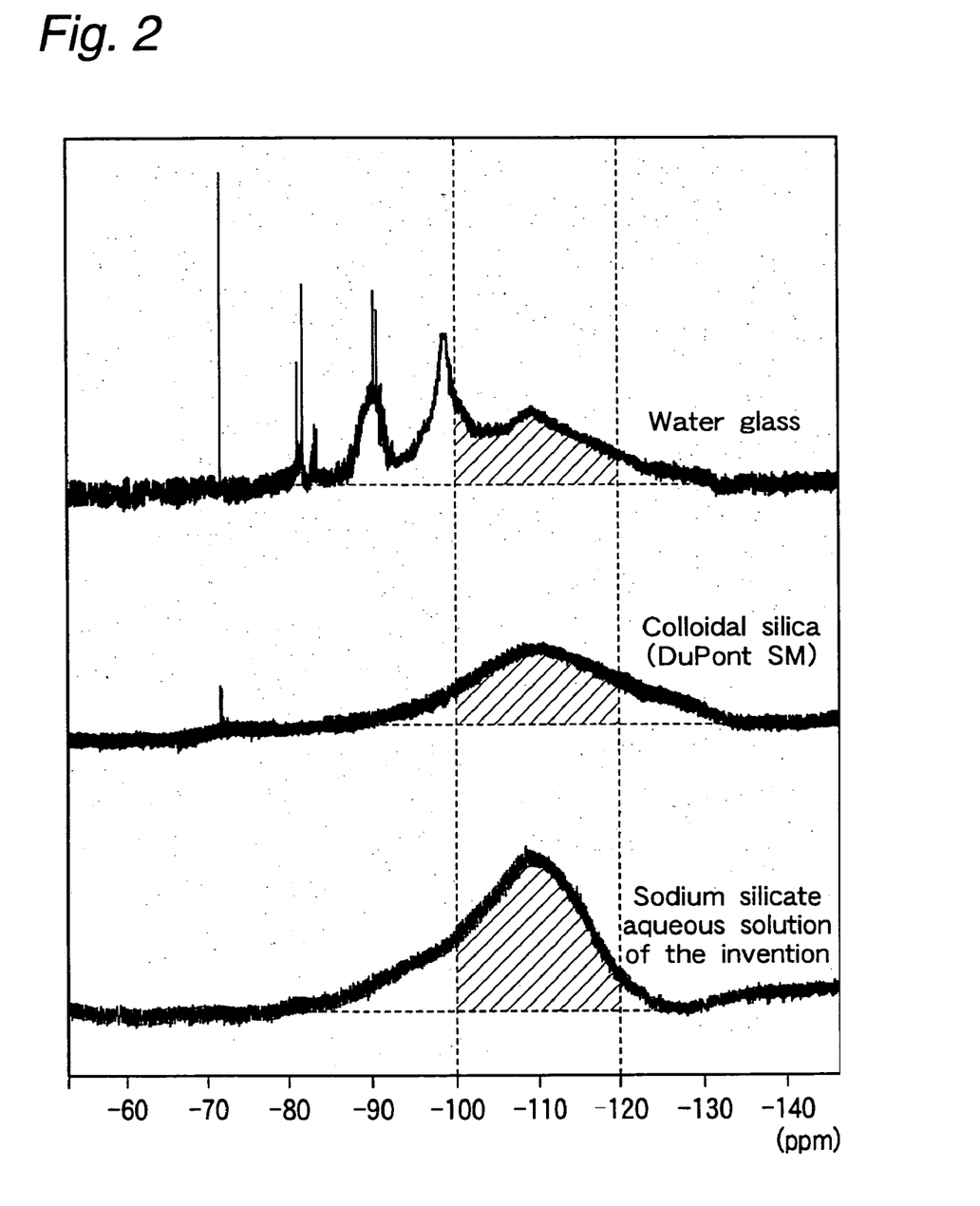
FIG. 2 shows $^{29}$Si-NMR spectra of a sodium silicate aqueous solution obtained in Production Example, water glass and colloidal silica (DuPont SM).

The dealkalized solution obtained from the desalting zones was temperature-controlled to 30 to 40° C., fed to a concentration tank of the reverse osmosis device and concentrated under the conditions of an inlet flow rate of 10 L/min, an average pressure of 3.0 MPa and a flux (30° C.) of 35 to 28 kg/m²-hr. As a result, a high-molar ratio sodium silicate aqueous solution was obtained that had the following composition and properties.
  (A) Molar ratio ($SiO_2/Na_2O$): 14.8
  (B) $SiO_2$ concentration: 16.3% by weight
  (C) zeta-potential: −58.6 MV.
  (D) The $^{29}Si$-NMR spectrum is shown in FIG. 2, in which $^{29}Si$-NMR spectra of the following water glass and colloidal silica measured under the same conditions are shown for comparison.

Water glass (Dilute No. 3 sodium silicate, available from toso Sangyo K.K.)
  Specific gravity (15° C.): 1.064
  $SiO_2$ (%): 5.80
  $Na_2O$ (%): 1.90
  $SiO_2/Na_2O$ (molar ratio): 3.15
  Zeta-potential: −27.5 MV
Colloidal silica (DuPont SM)
  Specific gravity (15° C.): 1.216
  $SiO_2$ (%): 30
  $Na_2O$ (%): 0.56
  $SiO_2/Na_2O$ (molar ratio): 55.26
  Zeta-potential: −34.0 MV The peak area at the chemical shift of −100 to −120 ppm in the $^{29}Si$-NMR spectrum of the sodium silicate aqueous solution of the invention was 2.28 times greater then the peak area of the water glass and was 1.27 times greater then the peak area of the colloidal silica (DuPont SM).

(E) Transmittance within the wavelength region of 1000 to 200 nm: 95 to 100%

Figure 3:
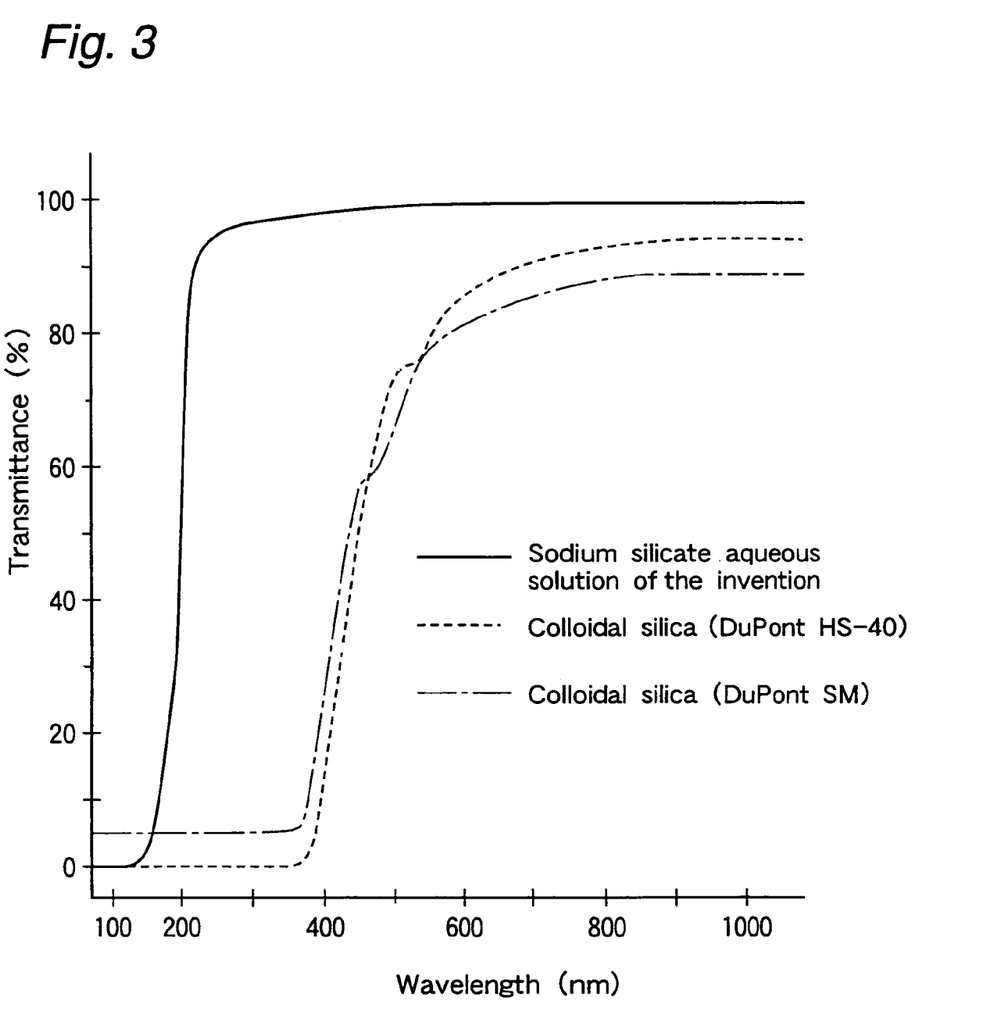
FIG. 3 shows results of absorptiometry analysis in ultraviolet and visible regions with respect to a sodium silicate aqueous solution obtained in Production Example, colloidal silica (DuPont SM) and colloidal silica (DuPont HS-40).

The result of the absorptiometry analysis in ultraviolet and visible regions is shown in FIG. 3, in which the results of the same analysis with respect to the colloidal silica (DuPont SM) and the following colloidal silica measured under the identical conditions- are shown for comparison.

Colloidal silica (DuPont HS-40)
Specific gravity (15° C.): 1.305
$SiO_2$ (%) 40
$Na_2O$ (%): 0.41
$SiO_2/Na_2O$ (molar ratio): 100.68
Zeta-potential: −36.7 MV (F) Electric conductivity: 7.5 mS/cm Methods and devices used to measure these properties are the following.

(A) Molar ratio ($SiO_2/Na_2O$)

$SiO_2$ and $Na_2O$ were analyzed in accordance with JIS K1408, and the molar ratio was calculated.

(B) $SiO_2$ concentration $SiO_2$ was analyzed in accordance with JIS K1408.

(C) Zeta-potential

The zeta-potential was measured by an electrophoresis light scattering method using DELSA 4403X manufactured by Beckmann Coalter Co.

(D) $^{29}Si$-NMR measurement

The $^{29}Si$-NMR was measured by means of an ALPHA-500 Model (500 MHz) manufactured by JEOL, Ltd.

(E) Transmittance

The transmittance was measured by means of a UV-550 Model manufactured by JASCO Corporation.

(F) Electric conductivity

The electric conductivity was measured by means of an ES-12 Model manufactured by HORIBA, Ltd.

Example 1

The sodium silicate aqueous solution, 100 parts by weight in terms of solids, produced in Production Example 1 was mixed with the components specified in Table 1. A photocatalytic coating composition was thus prepared.

A 50×200 mm glass substrate (TLC glass plate manufactured by Sougo Rikagaku Glass Seisakusho Co., Ltd.) was dipped into the coating composition to form a coating film on the substrate.

For the film thus produced, the strength, hydrophilicity and peel strength were evaluated as follows.

Film strength: The pencil scratch value was determined by a manual scratching method in accordance with JIS K5400.

Hydrophilicity: The coated glass substrate was left to stand in a dark place for at least 24 hours. Thereafter, the contact angle between the film and pure water was determined in the dark.

Film strength: The film was cross cut with a cutter to form one hundred 1×1 mm grids, over which an adhesive cellophane tape was applied. After the tape had been peeled off, the number of grids removed with the tape was counted.

Separately, a solution of the coating composition was stored in a dark place at 25° C. for 6 months, and the change in appearance of the solution was visually observed. After the storage, the solution was used to produce a film in the same manner as described above to evaluate the storage stability of the coating composition. The appearance of the film obtained from the stored solution was compared with that of a sample film produced from the same solution before it was stored. The results are shown in Table 1.

Comparative Example 1

The procedure of Example 1 was repeated except that the sodium silicate aqueous solution was replaced with colloidal silica (DuPont HS-40). The results are shown in Table 1.

Comparative Example 2

The procedure of Example 1 was repeated except that the sodium silicate aqueous solution was replaced with water glass (Dilute No.3 sodium silicate, available from Toso Sangyo K.K.) The results are shown in Table 1.

Comparative Example 3

The procedure of Example 1 was repeated except that no sodium silicate aqueous solution was used. The results are shown in Table 1.

TABLE 1

| | Composition (parts by weight) | | | | | | |
|---|---|---|---|---|---|---|---|
| | Alkali | | | Film-forming auxiliary | | | |
| | silicate aqueous solution (in terms of solids) | Colloidal silica (in terms of solids) | Water glass (in terms of solids) | Photocatalytic anatase titanium oxide (in terms of solids) | Amorphous titanium oxide (in terms of solids) | Modified silicone-containing surfactant (liquid) | Water |
| Ex. 1 | 100 | | | 4000 | 1500 | 200 | 194200 |
| Comp. Ex. 1 | | 100 | | 4000 | 1500 | 200 | 194200 |
| Comp. Ex. 2 | | | 100 | 4000 | 1500 | 200 | 194200 |
| Comp. Ex. 3 | | | | 4000 | 1500 | 200 | 194200 |

TABLE 1-continued

| | Properties of film | | | Storage stability | |
| --- | --- | --- | --- | --- | --- |
| | | | | Solution | |
| | Film strength | Hydrophilicity | Peel strength | appearance | Film appearance |
| Ex. 1 | 4H | 15° | No grids peeled | No change | Equal |
| Comp. Ex. 1 | 3H | 32° | No grids peeled | Flocculation and precipitation | Application impossible |
| Comp. Ex. 2 | 2H | 45° | No grids peeled | Flocculation and precipitation | Application impossible |
| Comp. Ex. 3 | 2H | 43° | 2 grids peeled | No change | Equal |

The invention claimed is:

1. A photocatalytic coating composition comprising:
(1) an alkali silicate aqueous solution having:
(A) a molar ratio of silicon to an alkali ($SiO_2/(A_2O+B)$ (A: alkali metal, B: $NH_3$)) in the range of 9 to 26; and
(B) a silicon concentration in terms of oxide ($SiO_2$ concentration) in the range of 6.8 to 30% by weight; and
(2) a photocatalytic compound of an anatase titanium oxide; and
(3) a film-forming auxiliary containing amorphous titanium oxide and modified-silicone surfactant.

2. The photocatalytic coating composition according to claim 1, which contains the alkali silicate aqueous solution (1) in an amount in terms of solids of 100 parts by weight and the photocatalytic compound (2) in an amount of 95 to 9500 parts by weight, and the film-forming auxiliary (3) in the amount of 95 to 9500 parts by weight.

3. The photocatalytic coating composition according to claim 1, wherein the alkali silicate aqueous solution (1) has a zeta-potential (C) in the range of −40 MV to −80 MV.

4. The photocatalytic coating composition according to claim 1, wherein the alkali silicate aqueous solution (1) has a peak area (D) at the chemical shift of −100 to −120 ppm in the $^{29}$Si-NMR measurement that is 1.35 times or more greater than the peak area of water glass at the chemical shift of −100 to −120 ppm measured by $^{29}$Si-NMR under the same conditions and is 1.20 times or more greater than the peak area of colloidal silica at the chemical shift of −100 to −120 ppm measured by $^{29}$Si-NMR under the same conditions.

5. The photocatalytic coating composition according to claim 1, wherein the alkali silicate aqueous solution (1) has a transmittance (E) within the wavelength region of 1000 to 200 nm measured by an absorptiometry that is in the range of 90 to 100%.

6. The photocatalytic coating composition according to claim 1, wherein the alkali silicate aqueous solution (1) has an electric conductivity (F) in the range of 2.1 to 30 mS/cm.

7. The photocatalytic coating composition according to claim 1, which forms a film that is excellent in hydrophilicity, film strength, adhesion and refractive index when applied to a substrate.

8. The photocatalytic coating composition according to claim 2, wherein the alkali silicate aqueous solution (1) has a zeta-potential (C) in the range of −40 MV to −80 MV.

9. The photocatalytic coating composition according to claim 2, wherein the alkali silicate aqueous solution (1) has a peak area (D) at the chemical shift of −100 to −120 ppm in the $^{29}$Si-NMR measurement that is 1.35 times or more greater than the peak area of water glass at the chemical shift of −100 to −120 ppm measured by $^{29}$Si-NMR under the same conditions and is 1.20 times or more greater than the peak area of colloidal silica at the chemical shift of −100 to −120 ppm measured by $^{29}$Si-NMR under the same conditions.

10. The photocatalytic coating composition according to claim 3, wherein the alkali silicate aqueous solution (1) has a peak area (D) at the chemical shift of −100 to −120 ppm in the $^{29}$Si-NMR measurement that is 1.35 times or more greater than the peak area of water glass at the chemical shift of −100 to −120 ppm measured by $^{29}$Si-NMR under the same conditions and is 1.20 times or more greater than the peak area of colloidal silica at the chemical shift of −100 to −120 ppm measured by $^{29}$Si-NMR under the same conditions.

11. The photocatalytic coating composition according to claim 2, wherein the alkali silicate aqueous solution (1) has a transmittance (E) within the wavelength region of 1000 to 200 nm measured by an absorptiometry that is in the range of 90 to 100%.

12. The photocatalytic coating composition according to claim 3, wherein the alkali silicate aqueous solution (1) has a transmittance (E) within the wavelength region of 1000 to 200 nm measured by an absorptiometry that is in the range of 90 to 100%.

13. The photocatalytic coating composition according to claim 4, wherein the alkali silicate aqueous solution (1) has a transmittance (E) within the wavelength region of 1000 to 200 nm measured by an absorptiometry that is in the range of 90 to 100%.

14. The photocatalytic coating composition according to claim 2, wherein the alkali silicate aqueous solution (1) has an electric conductivity (F) in the range of 2.1 to 30 mS/cm.

15. The photocatalytic coating composition according to claim 3, wherein the alkali silicate aqueous solution (1) has an electric conductivity (F) in the range of 2.1 to 30 mS/cm.

16. The photocatalytic coating composition according to claim 4, wherein the alkali silicate aqueous solution (1) has an electric conductivity (F) in the range of 2.1 to 30 mS/cm.

17. The photocatalytic coating composition according to claim 5, wherein the alkali silicate aqueous solution (1) has an electric conductivity (F) in the range of 2.1 to 30 mS/cm.

18. The photocatalytic coating composition according to claim 2, which forms a film that is excellent in hydrophilicity, film strength, adhesion and refractive index when applied to a substrate.

19. The photocatalytic coating composition according to claim 3, which forms a film that is excellent in hydrophilicity, film strength, adhesion and refractive index when applied to a substrate.

20. The photocatalytic coating composition according to claim 4, which forms a film that is excellent in hydrophilicity, film strength, adhesion and refractive index when applied to a substrate.

21. The photocatalytic coating composition according to claim 5, which forms a film that is excellent in hydrophilicity, film strength, adhesion and refractive index when applied to a substrate.

22. The photocatalytic coating composition according to claim 6, which forms a film that is excellent in hydrophilicity, film strength, adhesion and refractive index when applied to a substrate.

* * * * *